US007867310B2

(12) United States Patent
Baten (10) Patent No.: US 7,867,310 B2
(45) Date of Patent: Jan. 11, 2011

(54) METHOD AND APPARATUS FOR SEPARATING AIR AND OIL

(75) Inventor: Robert Allen Baten, Baytown, TX (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/362,422

(22) Filed: Jan. 29, 2009

(65) Prior Publication Data

US 2010/0187180 A1 Jul. 29, 2010

(51) Int. Cl.
*B01D 45/12* (2006.01)
(52) U.S. Cl. ............ 55/459.1; 55/459.2; 55/459.4; 55/459.5; 55/429; 55/426; 55/455; 55/385.1; 55/385.3; 55/423; 55/DIG. 3
(58) Field of Classification Search .......... 55/459.1, 55/459.2, 459.4, 459.5, 429, 455, DIG. 17, 55/345, 342, 385.1, 385.3, 423–426
See application file for complete search history.

(56) References Cited

U.S. PATENT DOCUMENTS

| 1,754,126 | A | * | 4/1930 | Stievenart | 96/316 |
| 1,791,304 | A | * | 2/1931 | Flick | 55/397 |
| 2,316,016 | A | * | 4/1943 | Packie | 55/458 |
| 2,343,682 | A | * | 3/1944 | McCurdy | 55/457 |
| 3,017,249 | A | * | 1/1962 | Marsh | 423/450 |
| 3,349,548 | A | * | 10/1967 | Boyen | 55/457 |
| 3,481,118 | A | * | 12/1969 | Swann et al. | 55/338 |
| 3,618,299 | A | * | 11/1971 | Vincent | 96/304 |
| 3,668,838 | A | * | 6/1972 | McNeil et al. | 96/195 |
| 3,822,533 | A | * | 7/1974 | Oranje | 55/394 |
| 3,877,904 | A | * | 4/1975 | Lowrie | 96/189 |
| 3,990,870 | A | * | 11/1976 | Miczek | 95/217 |
| 4,203,961 | A | * | 5/1980 | Cowley | 423/478 |
| 4,272,260 | A | * | 6/1981 | Klein et al. | 96/378 |
| 4,336,228 | A | * | 6/1982 | Cowley | 422/129 |
| 4,394,143 | A | * | 7/1983 | O'Dell | 96/372 |
| 4,990,290 | A | * | 2/1991 | Gill et al. | 261/30 |
| 5,180,486 | A | * | 1/1993 | Smolensky et al. | 210/195.1 |
| 5,181,943 | A | * | 1/1993 | Weber | 95/268 |
| 5,496,394 | A | * | 3/1996 | Nied | 95/271 |
| 5,635,068 | A | * | 6/1997 | Marandi | 210/512.1 |
| 5,879,422 | A | * | 3/1999 | Brottgårdh et al. | 55/325 |
| 6,231,645 | B1 | * | 5/2001 | Conrad et al. | 95/271 |
| 6,475,256 | B2 | * | 11/2002 | Matsubara et al. | 55/337 |
| 6,551,565 | B2 | * | 4/2003 | Confuorto et al. | 423/239.1 |
| 6,582,489 | B2 | * | 6/2003 | Conrad | 55/337 |
| 6,599,348 | B2 | * | 7/2003 | Chosnek et al. | 95/271 |
| 6,599,350 | B1 | * | 7/2003 | Rockwell et al. | 96/135 |
| 6,709,476 | B2 | | 3/2004 | Kitano et al. | |
| 6,715,705 | B2 | * | 4/2004 | Rowley, Jr. | 241/5 |
| 7,022,163 | B2 | * | 4/2006 | Olsson et al. | 95/268 |
| 7,044,999 | B2 | * | 5/2006 | Bankstahl et al. | 96/189 |

(Continued)

*Primary Examiner*—Jason M Greene
*Assistant Examiner*—Dung Bui
(74) *Attorney, Agent, or Firm*—Fletcher Yoder PC (57) ABSTRACT

Methods and devices for separating oil from a mixture of oil and air are provided. In various embodiments, an air/oil separator includes a cylindrical housing that creates a circular flow path of the air and oil. Further, the air/oil separator may include various flow guides that improve the air/oil separation properties of the separator. Other embodiments include a turbine engine with a lubrication system that includes the improved air/oil separator.

22 Claims, 7 Drawing Sheets

U.S. PATENT DOCUMENTS

| | | | |
|---|---|---|---|
| 7,150,773 B1* | 12/2006 | Duke | 55/418 |
| 7,335,313 B2* | 2/2008 | Moya | 210/788 |
| 7,419,522 B2* | 9/2008 | Arnold | 55/345 |
| 7,488,361 B2* | 2/2009 | Larnholm | 55/318 |
| 7,547,337 B2* | 6/2009 | Oh et al. | 55/345 |
| 7,594,942 B2* | 9/2009 | Polderman | 55/321 |
| 7,625,416 B2* | 12/2009 | Nilsen et al. | 55/418 |
| 2001/0047651 A1* | 12/2001 | Fukutani | 60/39.07 |
| 2004/0055470 A1* | 3/2004 | Strauser et al. | 96/417 |
| 2004/0099241 A1* | 5/2004 | Kirchberger | 123/196 CP |
| 2005/0132706 A1* | 6/2005 | Fukutani et al. | 60/726 |
| 2005/0284299 A1* | 12/2005 | Lane et al. | 96/209 |
| 2007/0209338 A1* | 9/2007 | Conrad | 55/345 |
| 2009/0101444 A1* | 4/2009 | Alecu | 184/11.2 |
| 2009/0133961 A1* | 5/2009 | Corattiyil et al. | 184/6.26 |

* cited by examiner

METHOD AND APPARATUS FOR SEPARATING AIR AND OIL

BACKGROUND OF THE INVENTION

The subject matter disclosed herein relates to air/oil separation techniques, e.g. air/oil separation in a lubrication system for an engine such as a turbine engine.

Many types of industrial machinery use lubrication systems to reduce friction in moving parts, thereby extending the life of the parts and reducing heat. For example, the bearings used to support the rotating parts of a gas or steam turbine are often coupled to a lubrication system that provides a continuous flow of oil that lubricates, cools, and removes debris from the bearings. Generally, after the oil flows through the bearings, the oil is recaptured, cooled, filtered and recycled through the lubrication system. During the process of delivering the oil to the bearings, the oil may tend to mix with air. Therefore, a lubrication system may include an air/oil separator that separates the oil from the air so that the oil can be reused.

Currently, various devices exist for the separation of oil and air. For example, an air/oil separator may operate by slowing the speed of air/oil mixture sufficiently to allow the oil to precipitate. The oil may then be drained back to an oil reservoir. This type of separator tends to be relatively large. Additionally, if the air flow rate is too high, air pressure differentials inside the separator may cause oil to pool in the separator rather than draining into the oil reservoir, thus depriving the lubrication system of oil. One solution to this problem is to use larger, more expensive separators. However, the use of a larger air/oil separator may not be feasible due to a lack of available space.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a centrifugal air/oil separator with a cylindrical housing that includes an air collection compartment, an oil collection compartment, and a separation compartment in between. The system also includes one or more air/oil inlets disposed tangentially along a wall of the cylindrical housing that are configured to receive an air/oil mixture and induce a circular motion of the air/oil mixture within the separation compartment. Furthermore, the air collection compartment and the separation compartment are separated by an annular ring that blocks the air/oil mixture from flowing along the wall from the separation compartment toward the air collection compartment.

In a second embodiment, a system includes a turbine engine with a lubrication system that includes an oil reservoir and two air/oil separators configured to separate air and oil from an air/oil mixture obtained from the engine and direct at least some of the separated oil to the oil reservoir. Furthermore, at least one of the air/oil separators is a centrifugal air/oil separator.

In a third embodiment, a method includes receiving an air/oil mixture and guiding the air/oil mixture into a rotational path that separates the oil from the air. The method further includes guiding the oil-heavy air away from an air outlet, routing the oil-light air/oil mixture toward the air outlet, and precipitating oil from the oil-heavy air/oil mixture onto a surface that guides the oil to an oil outlet.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention relate to improved air/oil separation techniques. In various embodiments, a centrifugal air/oil separator is provided that includes a housing configured to induce a rotation of an air/oil mixture and one or more flow guides configured to guide the heavier oil toward an oil outlet and guide the lighter air toward an air outlet. Furthermore, certain embodiments relate to improved air/oil separation techniques in a lubrication system of a turbine engine. For example, one embodiment provides a lubrication system for a turbine engine with a centrifugal air/oil separator that quickly and efficiently removes the majority of the oil from the air/oil mixture and a second air/oil separator that provides additional air/oil separation. The first centrifugal air/oil separator may prevent oil from pooling in the second air/oil separator. The centrifugal air/oil separator described herein is compact, inexpensive, easy to fabricate and works effectively with a high air flow.

Figure 1:
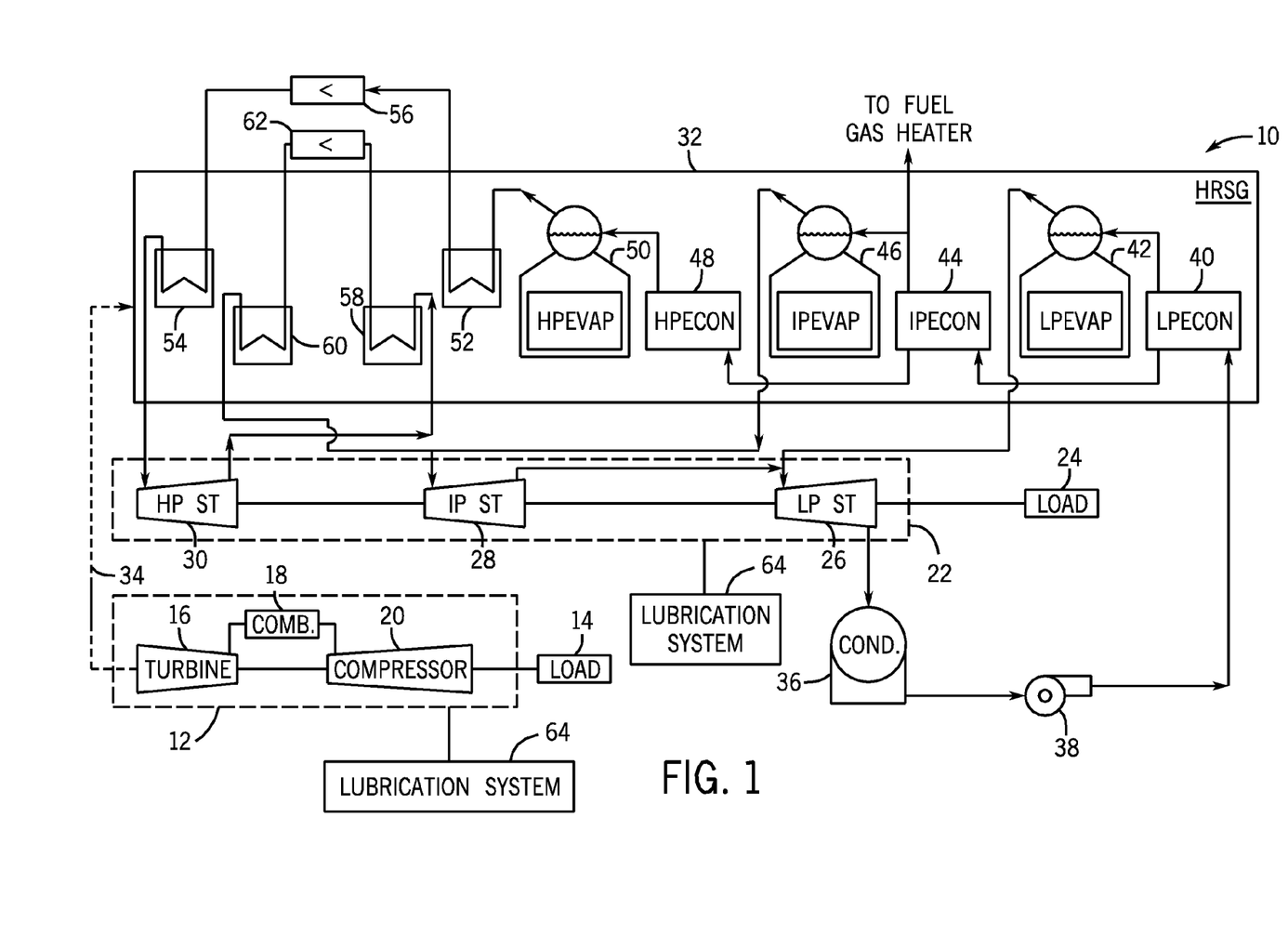
FIG. 1 is a schematic flow diagram of an embodiment of a combined cycle power generation system having a gas turbine, a steam turbine, and lubrication system with an improved air/oil separator.

FIG. 1 is a schematic flow diagram of an embodiment of a combined cycle power generation system 10 having a gas turbine, a steam turbine, and a lubrication system with an improved air/oil separator. As discussed below, the disclosed embodiments of the air/oil separator have a unique centrifugal design with one or more flow guides configured to guide the heavier oil toward an oil outlet and guide the lighter air toward an air outlet. The system 10 may include a gas turbine 12 for driving a first load 14. The first load 14 may, for instance, be an electrical generator for producing electrical power. The gas turbine 12 may include a turbine 16, a combustor or combustion chamber 18, and a compressor 20. The system 10 may also include a steam turbine 22 for driving a second load 24. The second load 24 may also be an electrical generator for generating electrical power. However, both the first and second loads 14, 24 may be other types of loads capable of being driven by the gas turbine 12 and steam turbine 22. In addition, although the gas turbine 12 and steam turbine 22 may drive separate loads 14 and 24, as shown in the illustrated embodiment, the gas turbine 12 and steam turbine 22 may also be utilized in tandem to drive a single load via a single shaft. In the illustrated embodiment, the steam turbine 22 may include one low-pressure section 26 (LP ST), one intermediate-pressure section 28 (IP ST), and one high-pressure section 30 (HP ST). However, the specific configuration of the steam turbine 22, as well as the gas turbine 12, may be implementation-specific and may include any combination of sections.

The system 10 may also include a multi-stage HRSG 32. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 12 may be transported into the HRSG 32 and used to heat steam used to power the steam turbine 22. Exhaust from the low-pressure section 26 of the steam turbine 22 may be directed into a condenser 36. Condensate from the condenser 36 may, in turn, be directed into a low-pressure section of the HRSG 32 with the aid of a condensate pump 38.

The condensate may then flow through a low-pressure economizer 40 (LPECON), a device configured to heat feedwater with gases, which may be used to heat the condensate. From the low-pressure economizer 40, the condensate may either be directed into a low-pressure evaporator 42 (LPEVAP) or toward an intermediate-pressure economizer 44 (IPECON). Steam from the low-pressure evaporator 42 may be returned to the low-pressure section 26 of the steam turbine 22. Likewise, from the intermediate-pressure economizer 44, the condensate may either be directed into an intermediate-pressure evaporator 46 (IPEVAP) or toward a high-pressure economizer 48 (HPECON). In addition, steam from the intermediate-pressure economizer 44 may be sent to a fuel gas heater (not shown) where the steam may be used to heat fuel gas for use in the combustion chamber 18 of the gas turbine 12. Steam from the intermediate-pressure evaporator 46 may be sent to the intermediate-pressure section 28 of the steam turbine 22. Again, the connections between the economizers, evaporators, and the steam turbine 22 may vary across implementations as the illustrated embodiment is merely illustrative of the general operation of an HRSG system that may employ unique aspects of the present embodiments.

Finally, condensate from the high-pressure economizer 48 may be directed into a high-pressure evaporator 50 (HPEVAP). Steam exiting the high-pressure evaporator 50 may be directed into a primary high-pressure superheater 52 and a finishing high-pressure superheater 54, where the steam is superheated and eventually sent to the high-pressure section 30 of the steam turbine 22. Exhaust from the high-pressure section 30 of the steam turbine 22 may, in turn, be directed into the intermediate-pressure section 28 of the steam turbine 22. Exhaust from the intermediate-pressure section 28 of the steam turbine 22 may be directed into the low-pressure section 26 of the steam turbine 22.

An inter-stage attemperator 56 may be located in between the primary high-pressure superheater 52 and the finishing high-pressure superheater 54. The inter-stage attemperator 56 may allow for more robust control of the exhaust temperature of steam from the finishing high-pressure superheater 54. Specifically, the inter-stage attemperator 56 may be configured to control the temperature of steam exiting the finishing high-pressure superheater 54 by injecting cooler feedwater spray into the superheated steam upstream of the finishing high-pressure superheater 54 whenever the exhaust temperature of the steam exiting the finishing high-pressure superheater 54 exceeds a predetermined value.

In addition, exhaust from the high-pressure section 30 of the steam turbine 22 may be directed into a primary re-heater 58 and a secondary re-heater 60 where it may be re-heated before being directed into the intermediate-pressure section 28 of the steam turbine 22. The primary re-heater 58 and secondary re-heater 60 may also be associated with an inter-stage attemperator 62 for controlling the exhaust steam temperature from the re-heaters. Specifically, the inter-stage attemperator 62 may be configured to control the temperature of steam exiting the secondary re-heater 60 by injecting cooler feedwater spray into the superheated steam upstream of the secondary re-heater 60 whenever the exhaust temperature of the steam exiting the secondary re-heater 60 exceeds a predetermined value.

In combined cycle systems such as system 10, hot exhaust may flow from the gas turbine 12 and pass through the HRSG 32 and may be used to generate high-pressure, high-temperature steam. The steam produced by the HRSG 32 may then be passed through the steam turbine 22 for power generation. In addition, the produced steam may also be supplied to any other processes where superheated steam may be used. The gas turbine 12 cycle is often referred to as the "topping cycle," whereas the steam turbine 22 generation cycle is often referred to as the "bottoming cycle." By combining these two cycles as illustrated in FIG. 1, the combined cycle power generation system 10 may lead to greater efficiencies in both cycles. In particular, exhaust heat from the topping cycle may be captured and used to generate steam for use in the bottoming cycle.

Both the steam turbine 22 and the gas turbine 12 include a rotating shaft for distributing power to the load 14 and 24. The shaft rotation is facilitated by several bearings which are capable of supporting a large weight and high rotational speeds. Friction within the bearings may tend to reduce the power efficiency of the turbine and may also tend to produce high levels of heat and frictional wear in the bearings. To reduce friction in the bearings, both the steam turbine 22 and the gas turbine 12 may include a lubrication system 64 that continuously circulates a supply of lubricating oil through the bearings. During the process of supplying oil to the bearings, the oil may be mixed with air. Therefore, before the oil is re-circulated through the lubrication system 64, the air and oil are separated. Accordingly, as will be discussed further below, the lubrication system 64 may include an improved air/oil separator in accordance with disclosed embodiments. Although, for illustration purposes, the lubrication system 64 is shown as a separate feature, it will be understood that elements of the lubrication system 64 may be integral with the turbine 12.

Figure 2:
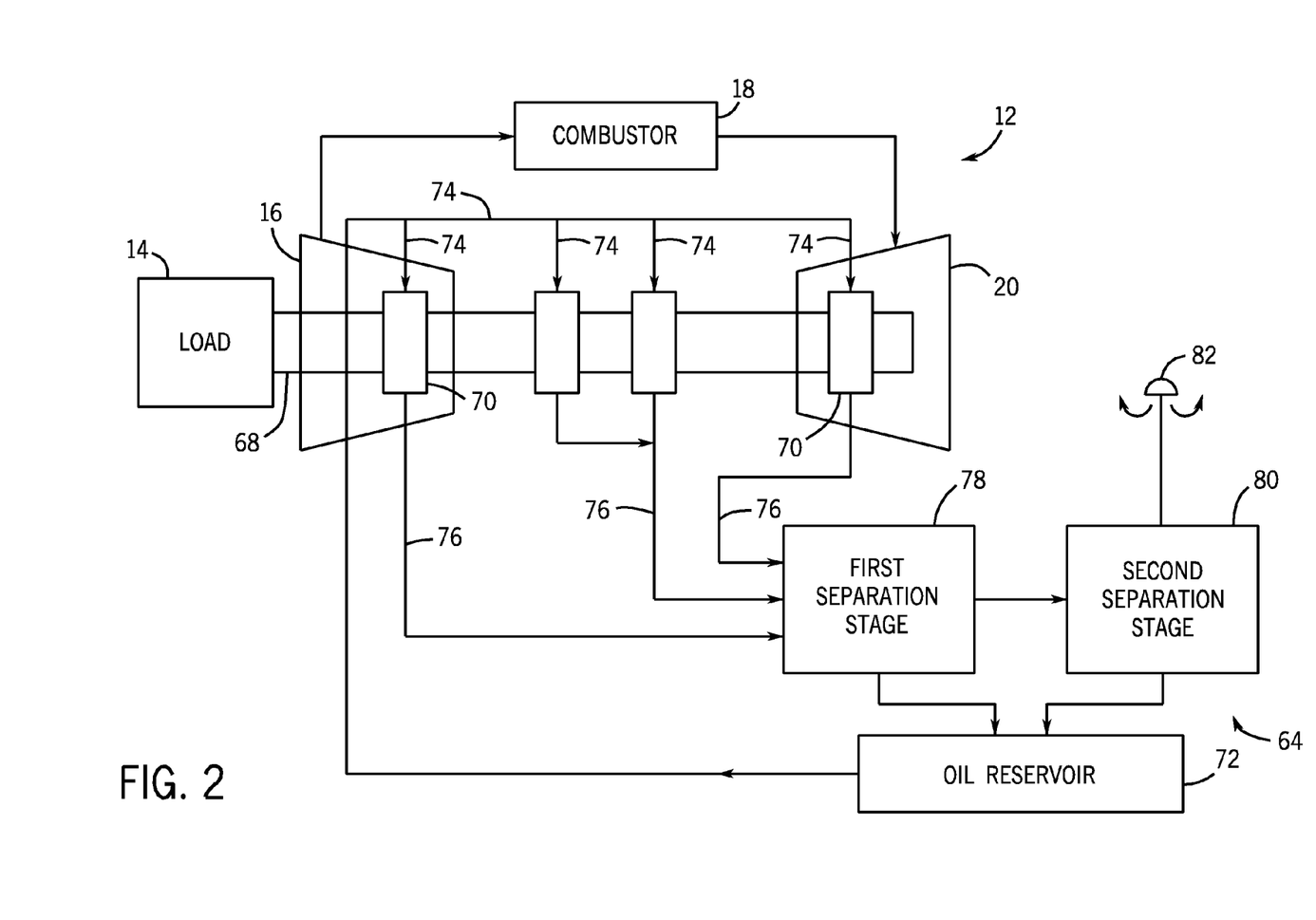
FIG. 2 is a block diagram illustrating an embodiment of a gas turbine engine with a lubrication system that includes an improved air-oil separator.

FIG. 2 is a block diagram illustrating an embodiment of a gas turbine engine with a lubrication system as shown in FIG. 1. As discussed above, the gas turbine 12 is used to provide power to a load 14 and includes the compressor 16, the combustor 18, and the turbine 20. Also shown in FIG. 2 is a shaft 68, which is driven into rotation by the turbine 20 and provides power to the compressor 16 and the load 14. The shaft 68 is supported by a plurality of bearings 70, which may be fluid bearings, journal bearings, ball bearings, roller bearings, etc., or any other suitable bearing. Furthermore, in various embodiments, the bearings 70 may support rotational and/or axial motion, and may also be thrust bearings. The location and number of bearings 70 shown in FIG. 2 is not intended to be a limitation of the present application. Accordingly, any number of bearings may be located throughout the gas turbine 12. For example, various bearings 70 may be located within the compressor 74, the turbine 74, the load 14 or between any two of the aforementioned components. The bearings 70 may also include labyrinth seals to inhibit the flow of lubricant between the shaft and the seal.

Oil may be supplied to the bearings 70 from an oil reservoir 72. In some embodiments, oil is suctioned out of the oil reservoir 72 and is delivered to the bearings 74 via the lubricant supply paths 74 using some of the air pressure created by the compressor 16. Within the lubricant supply paths 74 and/or the bearings 70, the oil may become mixed with air, creating an air/oil mixture such as an oil mist. The oil is circulated through the bearings 70 and exits the bearings via drainage lines 76, which carry the air/oil mixture to the first separation stage 78. The first separation stage 78 may include a centrifugal separator in accordance with the disclosed embodiments, which will be described in reference to FIGS. 4-7. The first separation stage 78 (e.g. the centrifugal separator) captures most of the oil from the air/oil mixture, and the captured oil is drained or pumped into the oil reservoir 72. The exhaust air will still contain some amount of oil, therefore, the exhaust air from the first separation stage 78 may be sent to a second separations stage 80, which removes most or all of the remaining oil from the air.

The second separation stage 80 may be any suitable air/oil separator, such as an improved centrifugal air/oil separator in accordance with the disclosed embodiments. In some embodiments, the second separation stage 80 may include a large volume wherein the speed of the air/oil mixture is reduced sufficiently to allow the oil to precipitate and collect on a medium bed such as a bed of ball-bearings. Oil collected in the second separation stage 80 drains into the oil reservoir 72, while the air is vented to the outside atmosphere through a vent 82. As discussed above, if the air flow rate is too high, air pressure differentials inside the second separation stage 80 may tend to cause oil to pool in the second separation stage 80 rather than draining into the oil reservoir 72. However, because most of the oil has already been re-captured by the first separation stage 78, the pooling of oil in the second stage separator 80 will not deprive the lubrication system 12 of oil. This enables the use of a much smaller second stage separator 80.

Figure 3:
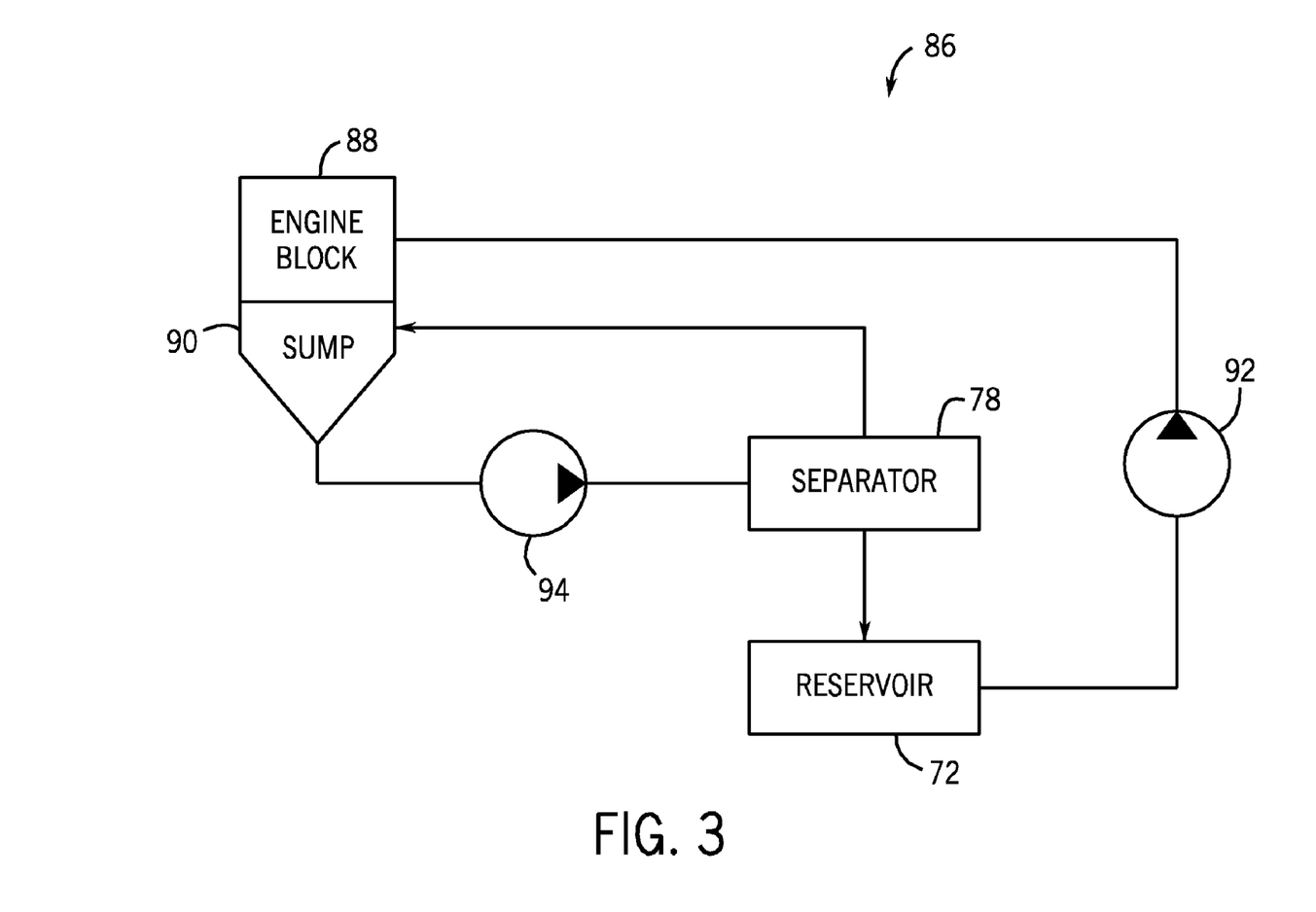
FIG. 3 is a block diagram illustrating an embodiment of an internal combustion engine with a lubrication system that includes an improved air/oil separator.

FIG. 3 is a block diagram illustrating an embodiment of an external combustion engine with a lubrication system that includes an improved centrifugal air/oil separator. The engine 86 may be any suitable type of internal combustion engine or compression ignition engine, including a gasoline engine or a diesel engine. The engine 86 includes an engine block 88 and a sump 90 that collects oil passed through the engine block 88. The components inside the engine block 88 are lubricated by a pump 92 that draws oil from the reservoir 72. The oil that drains through the engine block 88 is collected in the sump 90. Oil that collects in the sump 90 is then pumped back to the reservoir by a pump 94.

The engine 86 may be a "dry sump" system, meaning that at any given time only a small amount of oil may be contained within the sump 90. Therefore, the oil pumped from the sump 90 may include a mixture of oil and air. Accordingly, the oil pumped out of the sump 90 by the pump 94 may first be sent to an air/oil separator 78 (e.g. centrifugal separator), which will be described below in reference to FIGS. 4-7. Oil may then drain from the separator 78 into the reservoir 72, while air may be re-circulated back into the sump 90.

Figure 4:
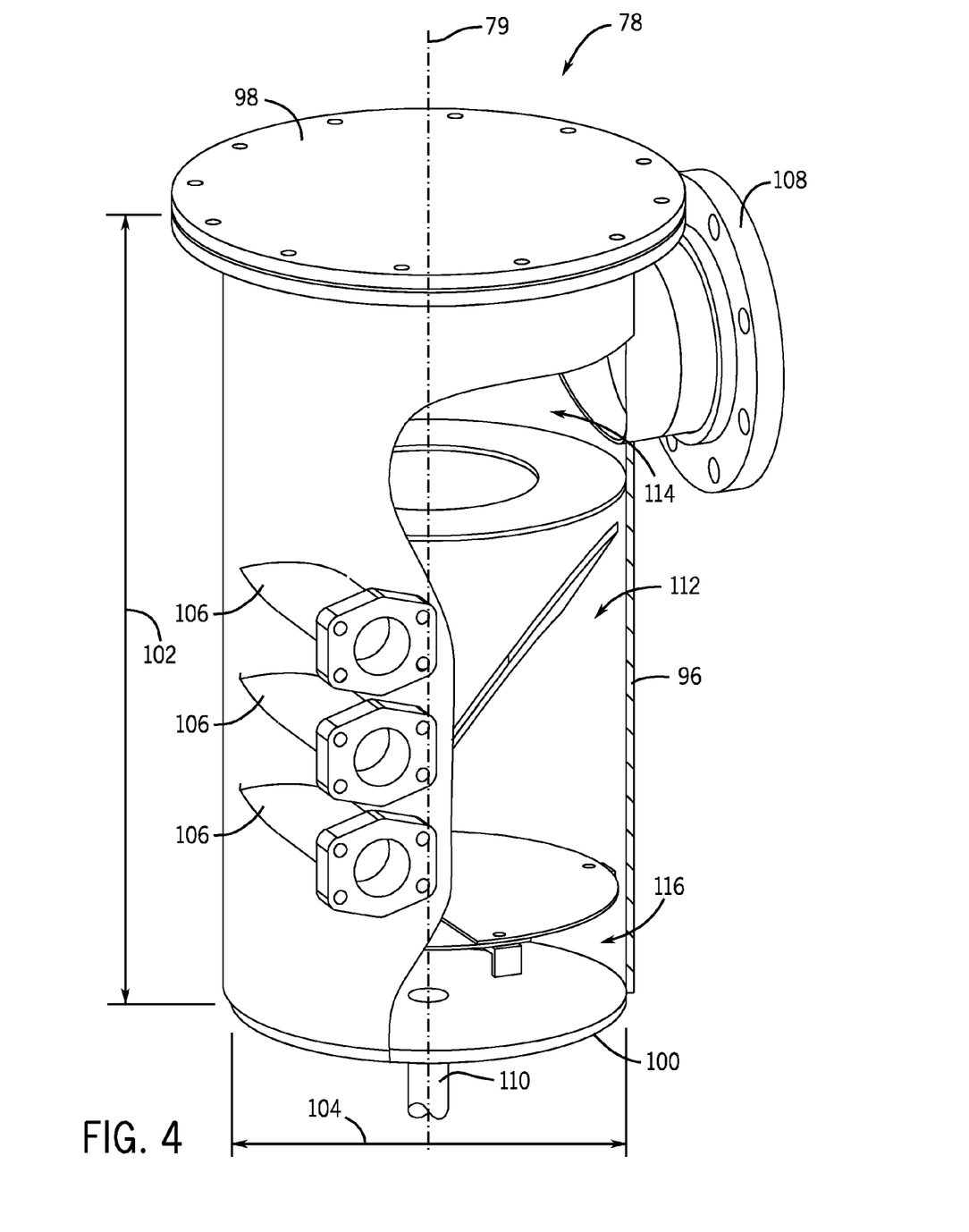
FIGS. 4 and 5 are cutaway perspective views of an embodiment of the improved air/oil separator of FIGS. 1-3.
Figure 5:
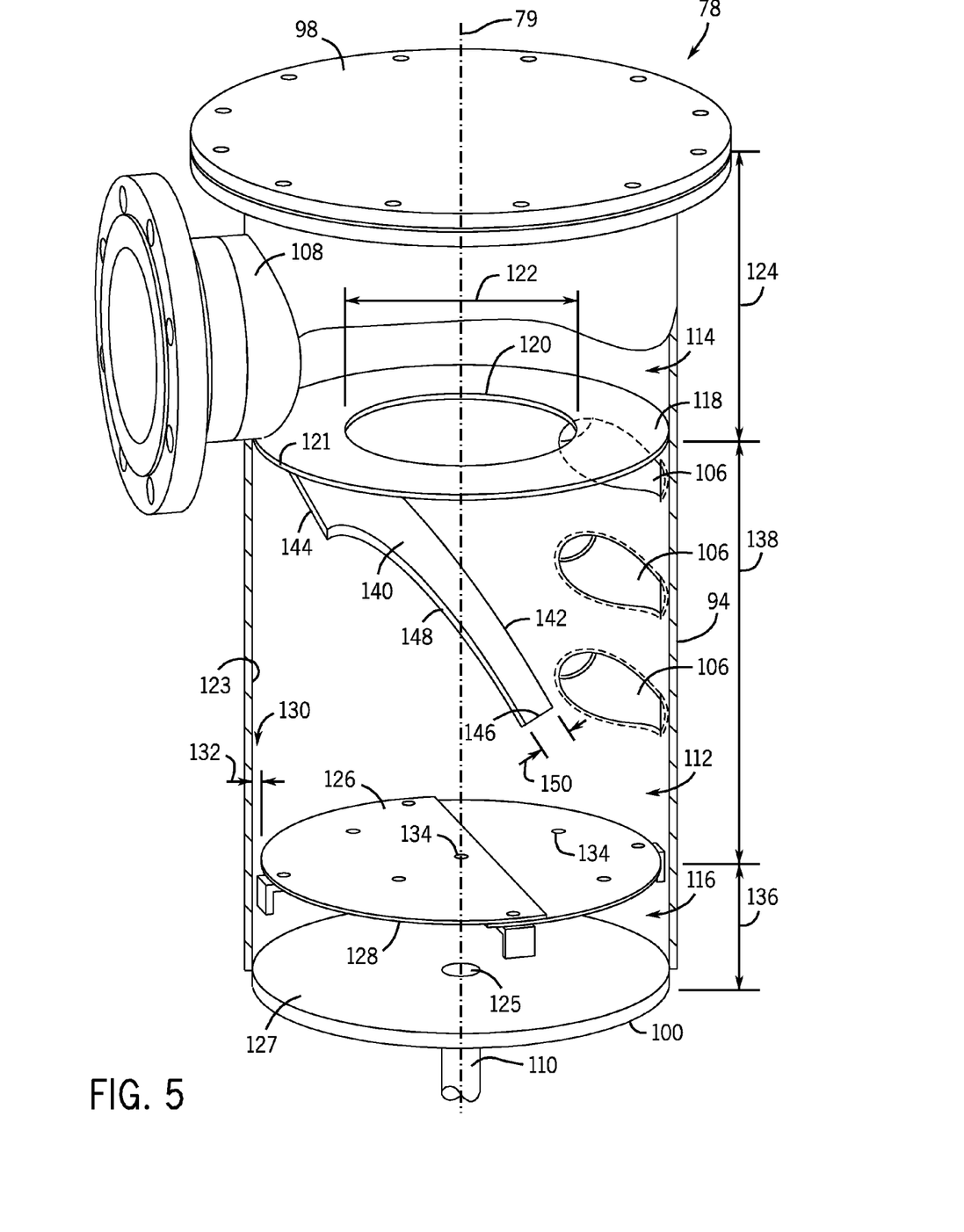
Figure 6:
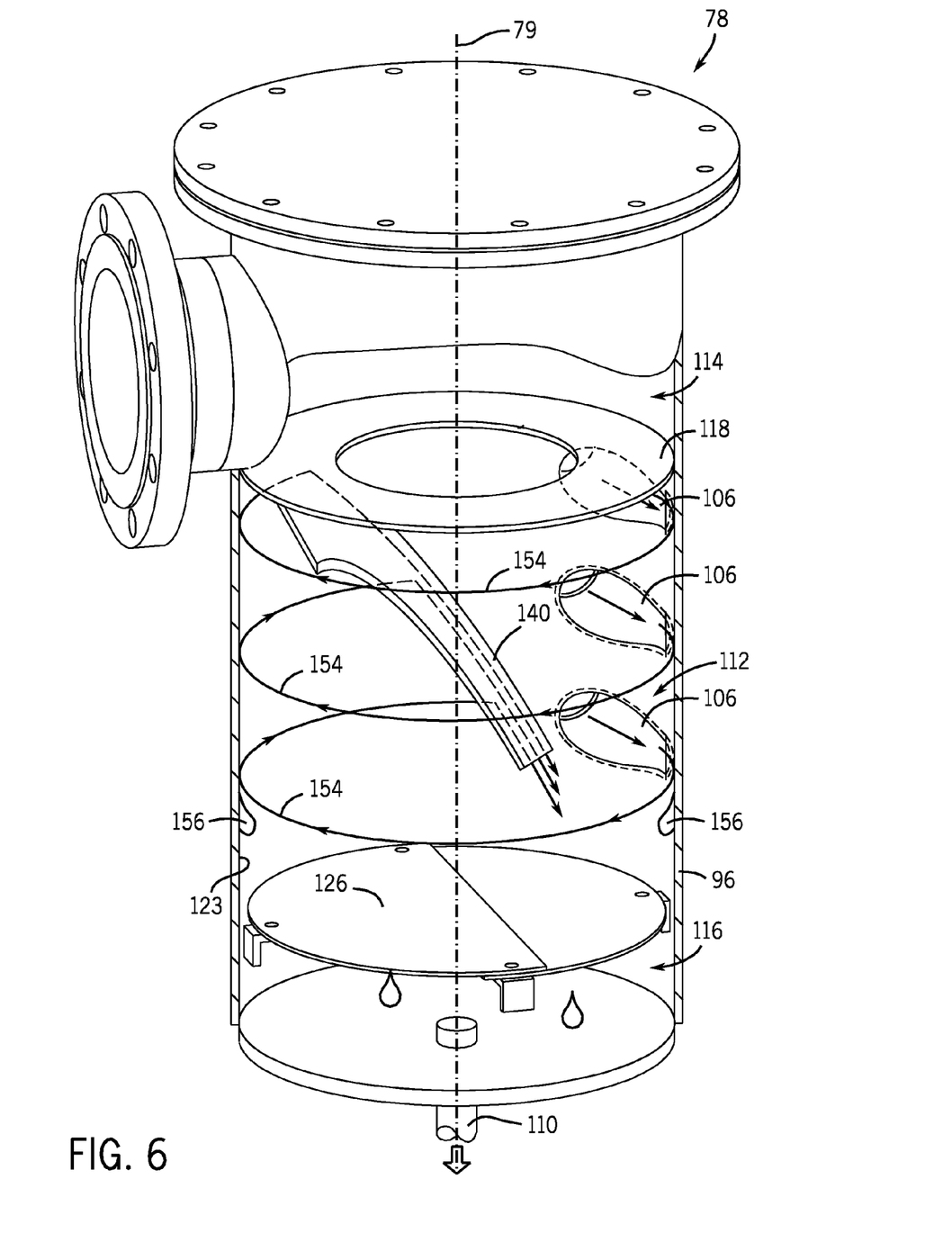
FIGS. 6 and 7 are cutaway perspective views of the improved air/oil separator of FIGS. 4 and 5, illustrating the flow of air and oil within the separator.
Figure 7:
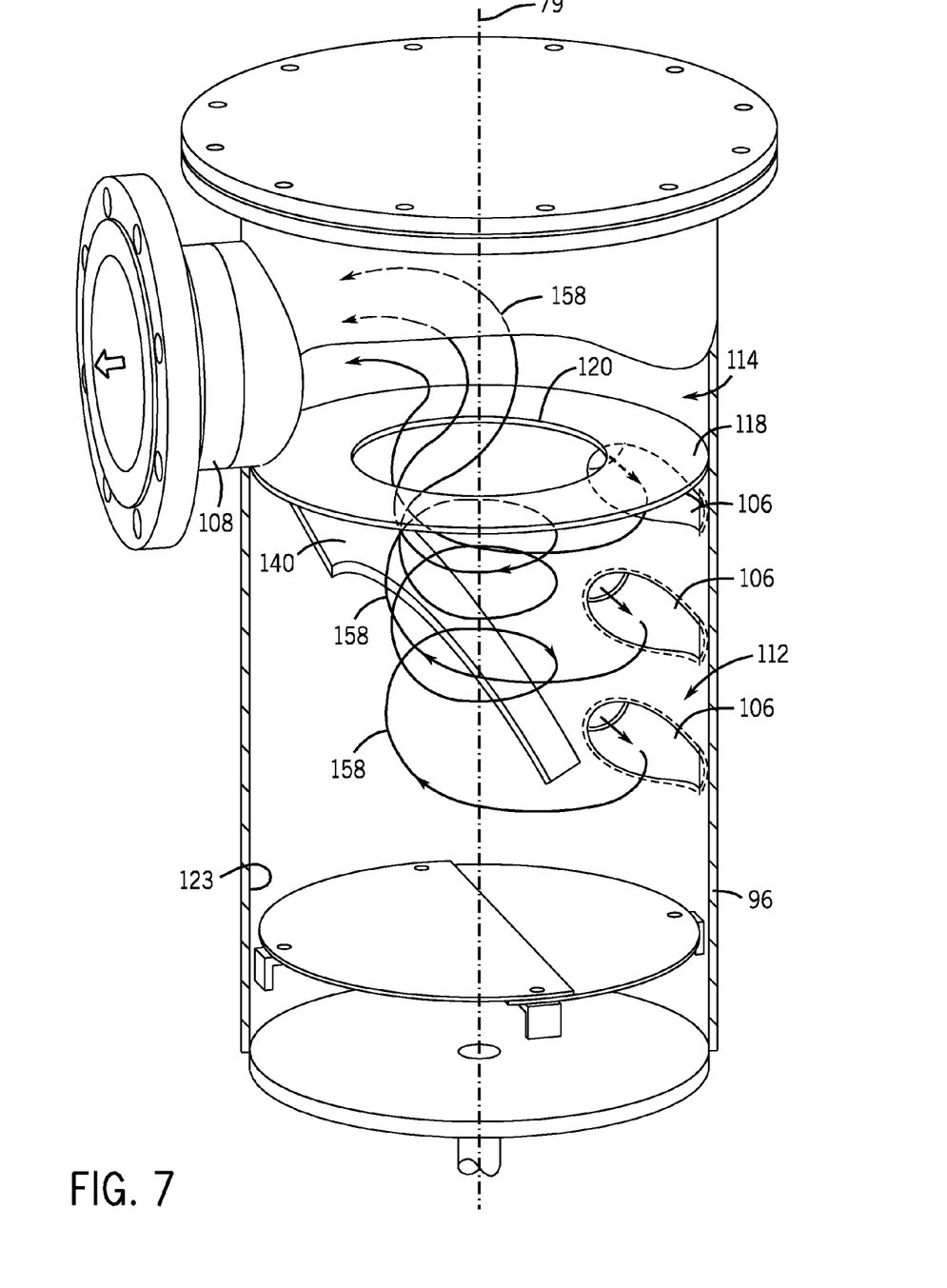

FIGS. 4-7 are cutaway perspective views that depict the improved centrifugal air-oil separator 78 in accordance with certain embodiments. FIGS. 4 and 5 illustrate the physical characteristics of the improved centrifugal air/oil separator 78, and FIGS. 6 and 7 illustrate flow characteristics of the separator 78.

FIG. 4 is a cutaway perspective view of an embodiment of the improved air/oil separator 78 referenced in relation to FIGS. 1-3. The separator 78 may include a hi-low cylindrical housing 96 capped with a top plate 98 and a bottom plate 100 at opposite ends of the housing 96. The housing 96, top plate 98, bottom plate 100 and other components of the separator 78 may be made of a metal such as aluminum or copper or a plastic such as polyvinyl chloride (PVC). In some embodiments, an axis 79 of the separator 78 may be aligned vertically during operation. In other embodiments, however, the axis 79 of the separator 78 may be aligned horizontally or at an intermediate angle between horizontal and vertical. The height 102 of the housing 96 may be approximately 18 to 48 inches or larger. The diameter 104 of the housing 96 may be approximately 12 to 16 inches or larger. In some embodiments, the height 102 of the housing 96 may be approximately 28.5 inches and the diameter 104 of the housing 96 may be approximately 14 inches. The size of the separator 78 is not intended to be a limitation of the disclosed embodiments. In some embodiments, the separator 78 may be several feet in diameter, depending on the air flow characteristics of the system in which it is employed.

The separator 78 may also include one or more air/oil inlets 106. The air/oil inlets 106 are configured to receive an air/oil mixture and induce a rotation of the air/oil mixture. In some embodiments, each air/oil inlet 106 may be coupled to an individual bearing 70 or set of bearings 70. In this way, the separator 78 may also serve to combine the air/oil mixture obtained from several sources, e.g. several bearings. In alternative embodiments, the separator 78 may include only one air/oil inlet 106. Each air/oil inlet 106 is coupled to the housing 96 tangentially such that the incoming air/oil mixture will be guided into rotation within the cylindrical housing 96 (e.g., a circular or helical path around the axis 79.) In this way, the air/oil mixture is rotated even though the separator 78 includes no moving parts.

After separating the oil and air, which will be described further below, the air exits the separator through the air outlet 108, which may be perpendicular to the axis of the separator 78. In other embodiments, the air outlet 108 may be in line with the axis of the separator 78. While most of the oil may be removed by the separator 78, in some embodiments, the air exiting the separator 78 through the air outlet 108 may still contain some amount of oil. Accordingly, the air outlet 108 may be coupled to an inlet of a second stage air/oil separator, which may be an improved centrifugal separator 78 in accordance with the disclosed embodiments or any other type of suitable air/oil separator. Meanwhile, the oil separated from the air/oil mixture exits the separator 78 through an oil outlet 110 at the bottom of the separator 78.

The separator 78 may include three compartments: a separation compartment 112 which receives an air/oil mixture and separates the oil from the air; an air collection compartment 114 which receives the air separated from the air/oil mixture and send it to the air outlet 108; and an oil collection compartment 116 which receives the oil separated from the air/oil mixture and sends it to the oil outlet 110. In some embodiments, the compartments may be sections of the separator housing 96, the upper section forming the air collection compartment 114, the middle section forming the separation compartment 112, and the lower section forming the oil collection compartment 116. The separator 78 operates by rotating the air/oil mixture so that centrifugal forces cause the heavier oil to move away from the center of rotation, i.e. the central axis 79, and toward the wall of the housing 96, while the lighter air moves toward the center of rotation 79. In this way, the separator 78 creates two divergent paths, one path for oil-heavy air (e.g., air that has a higher oil content) and another path for oil-light air (e.g., air with a lower oil content.) FIGS. 6 and 7 below provide a more detailed explanation of the operation of the separator 78. The physical configuration of the separator 78 may be better understood with reference to FIG. 5.

FIG. 5 is a cutaway perspective view of the improved air/oil separator shown in FIG. 4 rotated 180 degrees about the central axis 79 to provide a better view of the three internal compartments 112, 114, and 116. As shown in FIG. 5, the separator 78 may include one or more flow guides that block or guide oil-heavy air away from the air collection compartment 114, and that block or guide oil-light air toward the air collection compartment 114. For example, the air collection compartment 114 may be separated from the separation compartment 112 by a flow guide that may include an annular ring 118 that blocks oil droplets and oil-heavy air from entering the air collection compartment 114, while allowing oil-light air into the air collection compartment 114. The ring 118 may be coplanar with a cross-section of the separator 78 below the air outlet 108, and the opening 120 may be centered on the axis 79 of the separator 78. For example, the ring 118 may be parallel to both the plates 98 and 100 near the air outlet 108, but upstream from the air outlet 108 and downstream from the air inlets 106. The outer edge 121 of the ring 118 contacts the inside surface 123 of the housing 96, and the ring 118 may include a central opening 120 that allows air to pass from the separation compartment 112 to the air collection compartment 114 as will be explained further below in relation to FIG. 6. In certain embodiments, the diameter 122 of the opening 120 may be approximately 10 percent to 75 percent of the diameter of the housing 96. More specifically, in certain embodiments, the diameter 122 of the opening 120 may be approximately 50 percent to 60 percent of the diameter of the housing 96 In particular embodiments, the diameter 122 of the opening 120 may be approximately 7.5 inches for a 14 inch diameter housing 96. Further, the ring 118 may be positioned at a distance from the top plate 98 equal to approximately 15 percent to 50 percent of the total height 102 of the separator 78. More specifically, the ring 118 may be positioned at a distance 124 from the top plate 98 equal to approximately 30 percent to 40 percent of the total height 102 of the separator 78. In particular embodiments, the ring 118 may be positioned at a distance 124 from the top plate 98 equal to approximately 10 inches for a separator 78 with a total height 102 of approximately 28.5 inches.

The oil collection compartment 116 receives oil that condenses or precipitates out of the air, and includes a drainage port 125 fluidly coupled to the oil outlet 110. In certain embodiments, the bottom surface 127 of the oil collection compartment 116 may be tapered downwardly toward the oil outlet 110. Furthermore, the oil outlet may be located in the center of the bottom surface 127 or may be located off-center, e.g., toward the side wall 123 of the housing 96. In some embodiments, the oil collection compartment 116 may include more than one drainage port 125.

The oil collection compartment 116 is separated from the separation compartment 112 by a windage plate 126 that blocks air circulating in the separation compartment 112 from colliding with or otherwise disturbing the oil collecting in the oil collection compartment 116. The windage plate 126 may be of any configuration that allows oil to penetrate into the oil collection compartment 116 while substantially blocking most of the air currents circulating in the separation compartment 112. For example, as shown in FIG. 5, the windage plate 126 may be a solid plate that is coplanar with a cross-section of the housing 96 and slightly smaller in diameter than the housing. For example, the windage plate 126 may be parallel to both the plates 98 and 100 between the air inlets 106 and the drainage port 125. The relatively smaller diameter of the windage plate 126 provides a gap 130 between the outer edge 128 of the windage plate 126 and the inside wall 123 of the housing 96 around the circumference of the windage plate 126. The width 132 of the gap 130 may be approximately 0.25 to 1 inch or greater. In other embodiments, the windage plate 126 may be substantially the same diameter as the housing 96, eliminating the gap 130. The windage plate 126 may also include one or more holes 134 (e.g., perforated plate 126) for allowing oil to drain into the oil collection compartment 116. The holes 134 may be provided in addition to or instead of the gap 130. The windage plate 126 may be positioned at a distance 136 from the bottom plate 100 equal to approximately 10 percent to 25 percent of the total height 102 of the separator 78. More specifically, the windage plate 126 may be positioned at a distance 136 from the bottom plate 100 equal to approximately 2 to 6 inches for a separator 78 with a total height 102 of approximately 28.5 inches. In certain embodiments, the height 136 of the oil collection compartment 116 is approximately 4 inches for a separator 78 with a total height 102 of approximately 28.5 inches. In alternate embodiments, the windage plate 126 may be eliminated or supplemented with additional plates 126.

As will be explained further below with reference to FIGS. 6 and 7, the separation compartment 112 is the part of the separator 78 where the air/oil mixture separates into two divergent flow paths, e.g., one flow path containing the oil-heavy air and the other flow path containing the oil-light air. The separation compartment 112 is bounded by the ring 118 at the top and the windage plate 126 at the bottom. The height 138 of the separation compartment 112 may be approximately 25 to 75 percent of the total height 102 of the separator 78. The height 138 of the separation compartment 116 may be approximately 4 to 18 inches for a separator 78 with a total height 102 of approximately 28.5 inches. In certain embodiments, the height 138 of the separation compartment 138 may be approximately 14.5 inches for a separator 78 with a total height 102 of approximately 28.5 inches.

The separation compartment 112 also includes one or more flow guides. For example, the separation compartment 112 may include one or more vanes 140 that direct oil-heavy air and oil droplets toward the oil collection compartment 116. In the embodiment shown in FIG. 5, the separation compartment 112 includes one vane 140 that is positioned adjacent to the air/oil inlets 106 and includes a curved projection that projects inward from the inside surface 123 of the housing 96 toward the center of the separation chamber 112. The outside edge 142 of the vane 140 contacts the inside surface 123 of the housing 96, while the leading edge 144, the lagging edge 146 and the lateral edge 148 of the vane 140 are suspended within the internal volume of the separation compartment 112. In the embodiments shown, the vane 140 curves helically around the vertical axis 79 of the separator 78 along the inside surface 123 of the housing 96. The leading edge 144 of the vane 140 may be in contact with or just below the bottom surface of the ring 118, and the lagging edge 146 of the vane 140 may be just below the lowest air/oil inlet 106. In some embodiments, the vane 140 may extend lengthwise the full length of the separation compartment 112. Additionally, the vane 140 may extend circumferentially around approximately 20 to 50 percent or more of the circumference of the housing 96. In some embodiments, the vane 140 may wrap helically around the entire circumference of the housing 96. Furthermore, a width 150 of the vane (e.g., the distance that the vane 140 projects from the inside wall 123 of the housing 96) may be approximately 5 to 30 percent of the diameter 104 of the flow guide. In some embodiments, the width 150 of the vane may be approximately 2 inches for a separator 78 with a total height 102 of approximately 28.5 inches. The vane 140 may also project from the inside wall 123 of the housing perpendicularly or may be slanted downward.

Various alternative embodiments may encompass a wide range of variations of the vane 140. For example, in some embodiments, the separation compartment 112 may include more than one vane 140 (e.g., 2, 3, 4, 5, 6, 7, 8, 9, or 10 vanes), while in other embodiments, the separation compartment 112 may not include a vane 140 at all.

With the separator 78 described above, a large percentage of the oil within an air/oil mixture may be separated from the air/oil mixture. The operation of the air/oil separator may be better understood with reference to FIGS. 6 and 7, which illustrate the flow of air and oil within an embodiment of the separator 78. Specifically, FIG. 6 depicts the flow of oil within the separator 78, and FIG. 7 depicts the flow of air within the separator 78.

Turning to FIG. 6, the flow of oil within the separator 78 is represented by the arrows 154. The air/oil mixture enters the separation compartment 112 tangentially through the air/oil inlets 106. The tangential positioning of the air/oil inlets 106 causes the air within the separator 78 to go into a circular or helical swirling motion around the central axis 79 of the separator 78. The oil droplets suspended in the air/oil mixture are heavier than the air, therefore, the oil droplets tend to be pushed toward the outside of the separator 78, away from the central axis 79 and toward the inside wall 123 of the separator 78 as shown by the arrows 154. Oil droplets that contact the inside wall 123 may tend to adhere to the inside wall 123, thereby precipitating out of the air as shown by the oil droplets 156.

It will be appreciated that because the oil is heavier than the air, the air closer to the outer perimeter of the separation compartment 112 (e.g., closer to the inside wall 123) will contain relatively more oil than the air toward the central axis 79 of the separator 78. Accordingly, the ring 118 will tend to block the oil-heavy air from exiting the separation compartment 112 into the air collection compartment 114. In this way, the oil-heavy air will tend to re-circulate in the separation compartment 112 until a significant amount of oil has precipitated out of the air.

Additionally, the oil-heavy air may also be redirected by the vane 140, as shown by the arrows 154. The vane 140 may provide several advantages. For example, the oil-heavy air that hits the vane 140 will be subjected to another sharp change in direction. Accordingly, the oil, being heavier, will tend to be urged into contact with the under side of the vane 140, where it may adhere, thus separating from the air. For another example, the oil-heavy air will be guided toward the bottom of the separation chamber 112, closer to the oil collection compartment 116. Forcing the oil-heavy air toward the bottom of the separation chamber 112 may also tend to urge cleaner air toward the top of the separation chamber 112, closer to the air collection compartment 112. For yet another example, the vane 140 may block the oil-heavy air from recombining with the air/oil mixture entering via the air/oil inlets 106.

In accordance with one or more of the influences described above, oil in the air/oil mixture will tend to precipitate or condense along the inside wall 123 of the separation compartment 112, the under side of the vane 140, and the top of the windage plate 126. The liquid oil then drains into the oil collection compartment 116 and flows to the oil reservoir 72 via the oil outlet 110.

Turning to FIG. 7, the flow of oil-light air in the separator 78 is depicted. The flow of oil-light air is represented by the arrows 158. As shown in FIG. 7, the oil-light air enters the separation compartment 112 tangentially via the air/oil inlets 106 and is guided into rotation by the cylindrical shape of the separation chamber 112, as discussed above. The relatively lighter air is urged toward the center of the separator 78 (e.g., closer to the central axis 79 of the separator 78), because the heavier air is urged by centrifugal forces toward the inside wall 123 of the housing 96. Because the lighter, cleaner air is pushed toward the central axis 79, the oil-light air may not be blocked by the ring 118 or re-directed downward by the vane 140. In fact, because the vane 140 urges the oil-heavy air downward, it may also tend to urge the oil-light air upward, toward the air collection compartment 114. The oil-light air thus flows through the opening 120 in the ring 118 and into the air collection compartment 114, where it may then flow through the air outlet 108.

Because the separator 78 removes a large percentage of the oil from the air, the air exiting the air outlet 108 will have a much lower oil content. The mechanical simplicity and compactness of the separator 78 enables the separator 78 to be cost-effectively added to almost any system. For many embodiments, the level of air/oil separation obtained with the separator 78 may be sufficient to fully satisfy the air/oil separation needs of the system in which it is employed. In other embodiments, the separator 78 described above may provide only a portion of the air/oil separation needs of the system, in which case the air exhaust 108 of the separator 78 may be sent to a secondary air/oil separation stage. In this case, the separator 78 described above may reduce the air/oil separation demands of the second stage air/oil separator, resulting in a smaller, less expensive second stage air/oil separator. In either case, the improved separator described herein may enable significant space savings and monetary savings. Furthermore, unlike some other types of air/oil separator, the separator 78 described herein works more effectively as the air flow speed increases, because the increased centrifugal forces caused by the increased air flow speed provide greater separation of the heavier oil from the lighter air.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a centrifugal air/oil separator, comprising:
   a cylindrical housing comprising an air collection compartment, an oil collection compartment, and a separation compartment between the air and oil collection compartments;
   one or more air/oil inlets disposed tangentially along a wall of the cylindrical housing and configured to receive an air/oil mixture and induce a circular motion of the air/oil mixture within the separation compartment; and
   a helical flow guide disposed along the wall of the cylindrical housing, wherein the helical flow guide blocks the air/oil mixture from flowing directly along the wall from the separation compartment toward the air collection compartment;
   wherein the air collection compartment and the separation compartment are separated by an annular ring that blocks the air/oil mixture from flowing directly along the wall from the separation compartment toward the air collection compartment.

2. The system of claim 1, wherein the helical flow guide directs the air/oil mixture to flow toward the oil collection compartment and away from the air collection compartment.

3. The system of claim 1, wherein the helical flow guide comprises a curved vane that spirals around a central axis of the separation compartment.

4. The system of claim 1, wherein a plurality of air/oil inlets are fluidly coupled to a plurality of bearings of a turbine engine and receive the air/oil mixture from the plurality of bearings.

5. The system of claim 1, wherein the one or more air/oil inlets are fluidly coupled to a sump of an internal combustion engine and the one or more oil inlets receive the air/oil mixture from the sump.

6. The system of claim 1, wherein the oil collection compartment and the separation compartment are separated by a windage plate configured to allow oil to flow into the oil collection compartment and block the air/oil mixture from colliding with oil in the oil collection compartment.

7. The system of claim 6, wherein the windage plate is perforated.

8. The system of claim 1, wherein the helical flow guide spirals helically around a central axis of the separation compartment for a substantial portion of a length of the separation compartment.

9. The system of claim 8, wherein the helical flow guide spirals helically around the central axis of the separation compartment for at least half of the length of the separation compartment.

10. The system of claim 9, wherein the helical flow guide spirals helically around the central axis of the separation compartment for the entire length of the separation compartment.

11. A system, comprising:
a turbine engine; and
a lubrication system fluidly coupled to the turbine engine, comprising:
   an oil reservoir;
   a first air/oil separator, wherein the first air/oil separator comprises a centrifugal air/oil separator comprising a cylindrical housing having a wall about a central axis, an air inlet generally tangential to the cylindrical housing through the wall, and an air outlet disposed through the top of the centrifugal air/oil separator, and the centrifugal air/oil separator comprises a helical flow guide disposed along the wall between the air inlet and the air outlet, wherein the helical flow guide blocks air from flowing directly along the wall toward the air outlet and the helical flow guide spirals helically around the central axis for at least half of a length of a middle chamber of the centrifugal air/oil separator; and
   a second air/oil separator fluidly coupled to the first air/oil separator, wherein the first and second air/oil separators are configured to separate air and oil from an air/oil mixture obtained from the engine and direct at least some of the separated oil to the oil reservoir, wherein the first and second air/oil separators are structurally different from one another.

12. The system of claim 11, wherein the centrifugal air/oil separator comprises an annular ring abutting the wall and disposed downstream from the air inlet and upstream from the air outlet.

13. The system of claim 11, wherein the engine comprises a compression ignition engine or an internal combustion engine.

14. The system of claim 11, wherein the second air/oil separator comprises a bed of ball bearings.

15. The system of claim 11, wherein the first and second air/oil separators are different sizes.

16. The system of claim 11, wherein the helical flow guide spirals helically around the central axis for the entire length of the middle chamber of the centrifugal air/oil separator.

17. The system of claim 11, wherein the helical flow guide comprises a vane disposed along the wall and directed at an angle away from the air outlet toward an oil outlet.

18. The system of claim 17, wherein an outer edge of the vane is coupled to the wall, and an inner edge of the vane is not coupled to any structure.

19. A method of separating oil from air, comprising:
receiving an air/oil mixture into a chamber;
guiding the air/oil mixture into a rotational path along a wall of the chamber to separate an oil-heavy air/oil mixture from an oil-light air/oil mixture;
guiding the oil-heavy air/oil mixture along the wall in a spiraling flow path away from an air outlet;
routing the oil-light air/oil mixture toward the air outlet while blocking the oil-light air/oil mixture from flowing directly along the wall via an annular ring directly abutting the wall between the air outlet and the oil outlet;
precipitating oil from the oil-heavy air/oil mixture through perforated plate toward an oil outlet.

20. The method of claim 19, wherein guiding the air/oil mixture into the rotational path comprises directing the air/oil mixture into a cylindrical housing through a plurality of air/oil inlets oriented tangentially to the cylindrical housing, wherein each air/oil inlet is coupled to a different lubrication region.

21. The method of claim 19, comprising guiding the oil-heavy air/oil mixture along the wall in the spiraling flow path for at least half of a length of the chamber.

22. The method of claim 21, comprising guiding the oil-heavy air/oil mixture along the wall in the spiraling flow path for the entire length of the chamber.

* * * * *